(12) United States Patent
Ito

(10) Patent No.: US 12,372,732 B2
(45) Date of Patent: Jul. 29, 2025

(54) CONNECTOR FOR HIGH-SPEED TRANSMISSION

(71) Applicant: YAMAICHI ELECTRONICS CO., LTD., Tokyo (JP)

(72) Inventor: Toshiyasu Ito, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 312 days.

(21) Appl. No.: 18/210,968

(22) Filed: Jun. 16, 2023

(65) Prior Publication Data

US 2023/0408778 A1 Dec. 21, 2023

(30) Foreign Application Priority Data

Jun. 17, 2022 (CN) .......................... 202210692766.5

(51) Int. Cl.
*H04B 10/00* (2013.01)
*G02B 6/42* (2006.01)
*H04B 10/40* (2013.01)

(52) U.S. Cl.
CPC ......... *G02B 6/4284* (2013.01); *G02B 6/4277* (2013.01); *G02B 6/4283* (2013.01); *H04B 10/40* (2013.01)

(58) Field of Classification Search
CPC .. G02B 6/4284; G02B 6/4277; G02B 6/4283; G02B 6/4246; H04B 10/40; H01R 13/502; H01R 13/02; H01R 13/447; H01R 13/648
See application file for complete search history.

(56) References Cited

U.S. PATENT DOCUMENTS

| | | | | |
|---|---|---|---|---|
| 7,798,820 B2* | 9/2010 | Hong | ..................... | H05K 1/117 439/76.1 |
| 8,353,707 B2* | 1/2013 | Wang | ..................... | H01R 24/60 439/60 |
| 8,506,333 B2* | 8/2013 | Wang | ................... | H01R 12/721 439/626 |
| 8,727,793 B2* | 5/2014 | Cafiero | ................ | G02B 6/4201 439/540.1 |
| 8,764,464 B2* | 7/2014 | Buck | ...................... | H01R 12/00 439/189 |
| 8,764,488 B2* | 7/2014 | Zeng | .................. | H01R 13/6585 439/108 |
| 8,858,237 B2* | 10/2014 | Hsu | ....................... | H01R 13/514 439/60 |
| 9,083,130 B2* | 7/2015 | Casher | .................. | H01R 12/00 |
| 9,337,585 B1* | 5/2016 | Yang | ................. | H01R 13/6583 |
| 9,455,530 B2* | 9/2016 | Patel | ................. | H01R 13/6597 |
| 9,509,098 B1* | 11/2016 | Henry | ................ | H01R 13/6471 |

(Continued)

*Primary Examiner* — Agustin Bello
(74) *Attorney, Agent, or Firm* — Hayes Soloway P.C.

(57) ABSTRACT

A high-speed transmission connector includes a connector housing with a slot, upper and lower plate portions facing each other across the slot, first and second contact rows arranged face to face with each other within the connector housing, first and second caps supported in a hole of the upper plate portion and the lower plate portion, respectively. Each contact of the first and second contact row includes a receiving portion to receive a header of an external communication device. The receiving portion includes a receiving tip end portion facing an insertion side of the header and a curved portion extending from a rear end of the receiving tip end portion and bent in an arch shape.

15 Claims, 13 Drawing Sheets

(56) References Cited

U.S. PATENT DOCUMENTS

| | | | |
|---|---|---|---|
| 9,759,879 B1* | 9/2017 | Takai | H05K 1/117 |
| 10,581,201 B2* | 3/2020 | Hsu | H01R 13/405 |
| 10,916,891 B2* | 2/2021 | Hsu | H01R 13/6585 |
| 11,025,013 B2* | 6/2021 | Little | H01R 12/72 |
| 11,398,693 B2* | 7/2022 | Yang | H01R 31/08 |
| 11,527,844 B2* | 12/2022 | Chung | H01R 13/6474 |
| 2016/0211620 A1* | 7/2016 | Sharf | H01R 12/724 |
| 2019/0131743 A1* | 5/2019 | Hsu | H01R 13/405 |
| 2023/0408778 A1* | 12/2023 | Ito | G02B 6/4283 |

* cited by examiner

CONNECTOR FOR HIGH-SPEED TRANSMISSION

CROSS-REFERENCE TO RELATED APPLICATION

This application claims the benefit of Chinese Patent application CN 202210692766.5 filed on Jun. 17, 2022, the contents of which are incorporated herein by reference herein.

TECHNICAL FIELD

The present disclosure relates to a connector for high-speed transmission mounted on a circuit board.

BACKGROUND

An OSFP (Octal Small Form Factor Pluggable) type connector has a structure in which at least one row of upper contacts and at least one row of lower contacts are supported by and stored in upper and lower housings at a predetermined distance above and below, respectively, and both ends of the upper and lower contacts are electrically connected to external devices, for example, an optical transceiver and a circuit board, so that high-speed signal transmission can be realized.

Of the two ends of the upper and lower contacts, the connection between one end and the circuit board is generally performed by soldering, and the electrical connection between the other end and the optical transceiver is generally realized by inserting the module substrate of the optical transceiver through a slot provided on one side surface of the housing, sandwiching electrodes provided on the upper and lower surfaces of the module substrate between the upper and lower contacts inside the housing, and making the electrodes abut against vertically adjacent portions having an inverted arch shape and an arch shape (hereinafter referred to as "curved portion") in the receiving portion of the contact.

According to conventional technology, for both the signal contact and the ground (GND) contact, from the viewpoint of manufacturing cost, etc., there was no protective material provided at a portion of the tip end (hereinafter referred to as "receiving tip end portion") than the curved portion in the receiving portion, and the receiving tip end portion remains exposed within the slot. For this reason, there has been a problem that a part of high frequency signals flowing from the module substrate to the signal contact through the curved portion flowed to the receiving tip end portion and then flowed back in due to reflection from the free end, causing noise and deteriorated transmission characteristics.

The present disclosure has been made in view of the above circumstances, and a main object thereof is to provide a high-speed transmission connector having a structure that enables good transmission characteristics by suppressing the generation of noise caused by the receiving tip end portion.

SUMMARY

In accordance with a first aspect of the present disclosure, there is provided a high-speed transmission connector including:

a connector housing that has a slot into which a header of an external communication device is fitted, and an upper plate portion and a lower plate portion facing each other with the slot sandwiched therebetween, and is provided with holes opened on the slot side in the upper plate portion and the lower plate portion;

a first contact row arranged within the connector housing;

a second contact row arranged face to face with the first contact row within the connector housing;

a first cap supported in the hole of the upper plate portion by making a portion project to the slot side; and a second cap supported in the hole of the lower plate portion by making a portion project to the slot side, wherein each contact of the first contact row and the second contact row includes a receiving portion that receives the header, and the receiving portion includes a receiving tip end portion facing an insertion side of the header and positioned at a certain angle with respect to a surface of the header, and a curved portion extending from a rear end of the receiving tip end portion and bent in an arch shape, wall surfaces of the first cap and the second cap on sides where the contacts are located are provided with accommodation spaces accommodating at least a portion of the receiving tip end portion, the receiving tip end portion of each contact in the first contact row is in contact with the wall surface within the accommodation space of the first cap or faces the wall surface through a gap, the receiving tip end portion of each contact in the second contact row is in contact with the wall surface within the accommodation space of the second cap or faces the wall surface through a gap.

Further, In accordance with a second aspect of the present disclosure, there is provided a high-speed transmission connector including:

a connector housing that has a slot into which a header of an external communication device is fitted, and an upper plate portion and a lower plate portion facing each other with the slot sandwiched therebetween, and is provided with holes opened on the slot side in the upper plate portion and the lower plate portion;

a first contact row arranged within the connector housing, in which one or more signal contacts and ground contacts are lined up;

a second contact row arranged facing the first contact row within the connector housing, in which one or more signal contacts and ground contacts are lined up;

a first cap attached to a tip end on a side of the first contact row where the header is received; and a second cap attached to a tip end on a side of the second contact row where the header is received, wherein each contact of the first contact row and the second contact row has a receiving portion that receives the header, and the receiving portion includes a receiving tip end portion located on a first cap side and a second cap side, and a curved portion extending from a rear end of the receiving tip end portion to a side opposite to the first cap side and the second cap side and bent in an arch shape, the first cap is provided with an accommodation space accommodating the receiving tip end portion of the signal contact of the first contact row, and is supported by the ground contact of the first contact row, the second cap is provided with an accommodation space accommodating the receiving tip end portion of the signal contact of the second contact row, and is supported by the ground contact of the second contact row.

DETAILED DESCRIPTION

Hereinafter, some of the embodiments of the present disclosure will be described with reference to the drawings.

(1) First Embodiment

Figure 1:
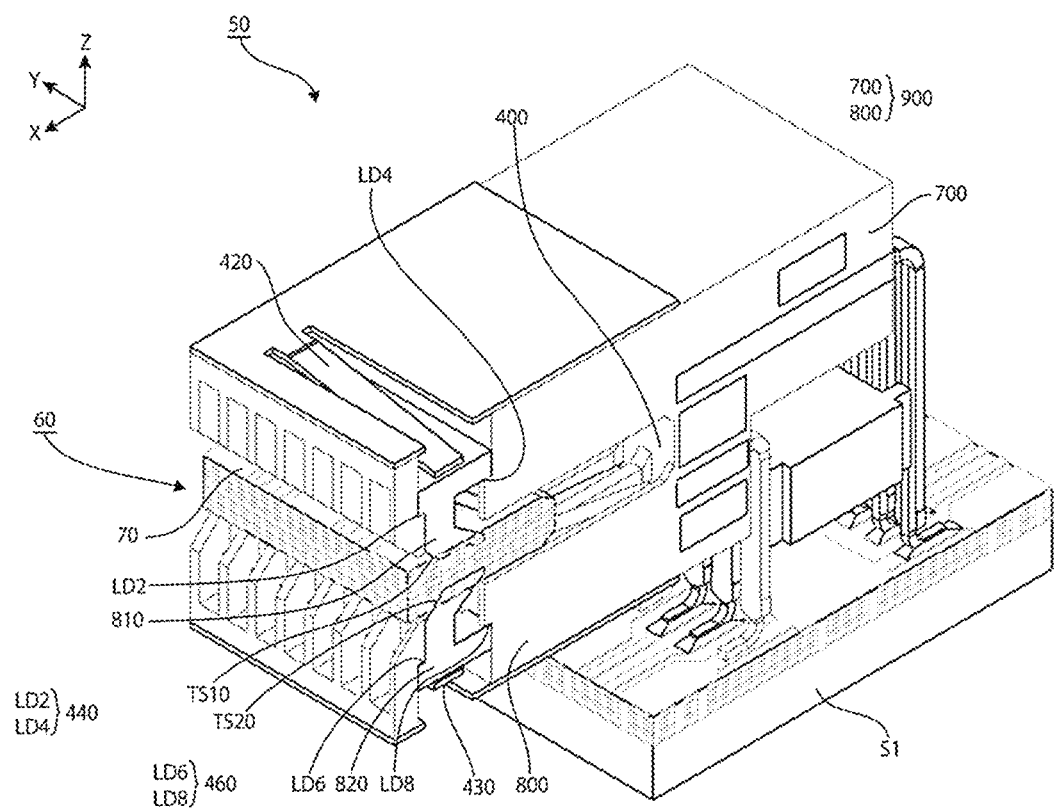
FIG. 1 is an example of a cross-sectional perspective view in which a high-speed transmission connector according to a first embodiment of the present disclosure is cut with an example of an optical transceiver along an inserting direction of the optical transceiver.
Figure 2:
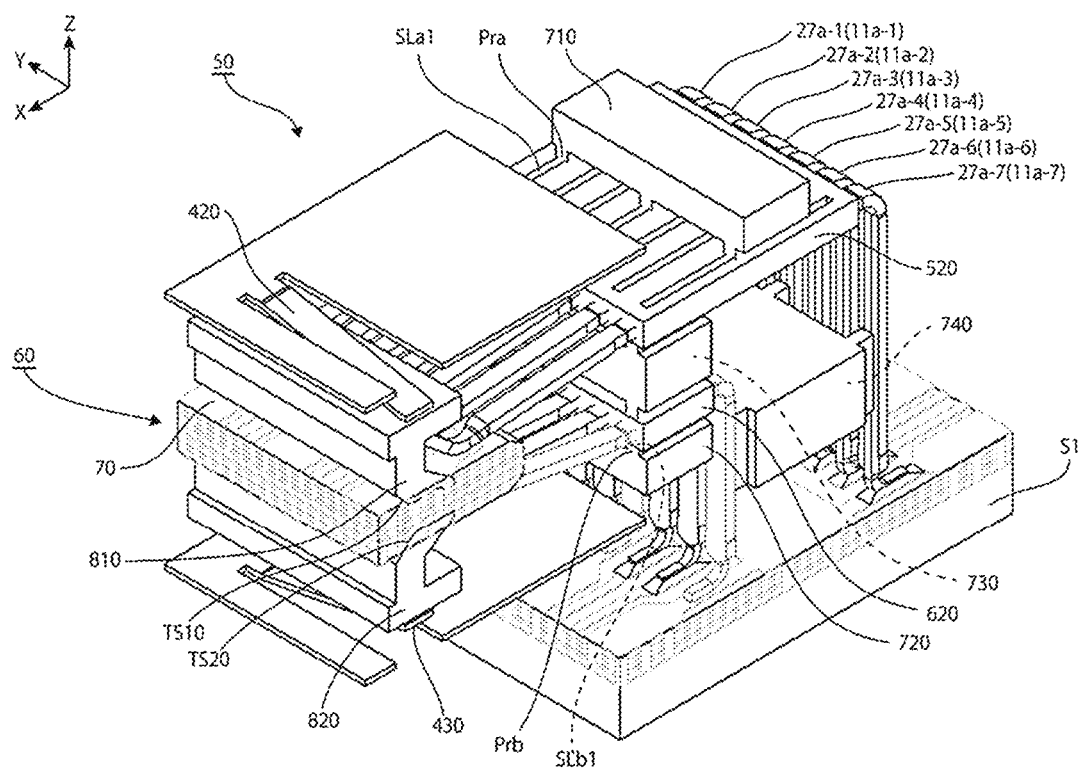
FIG. 2 is an example of a cross-sectional perspective view in which a connector housing has been omitted from the cross-sectional perspective view in FIG. 1.
Figure 3:
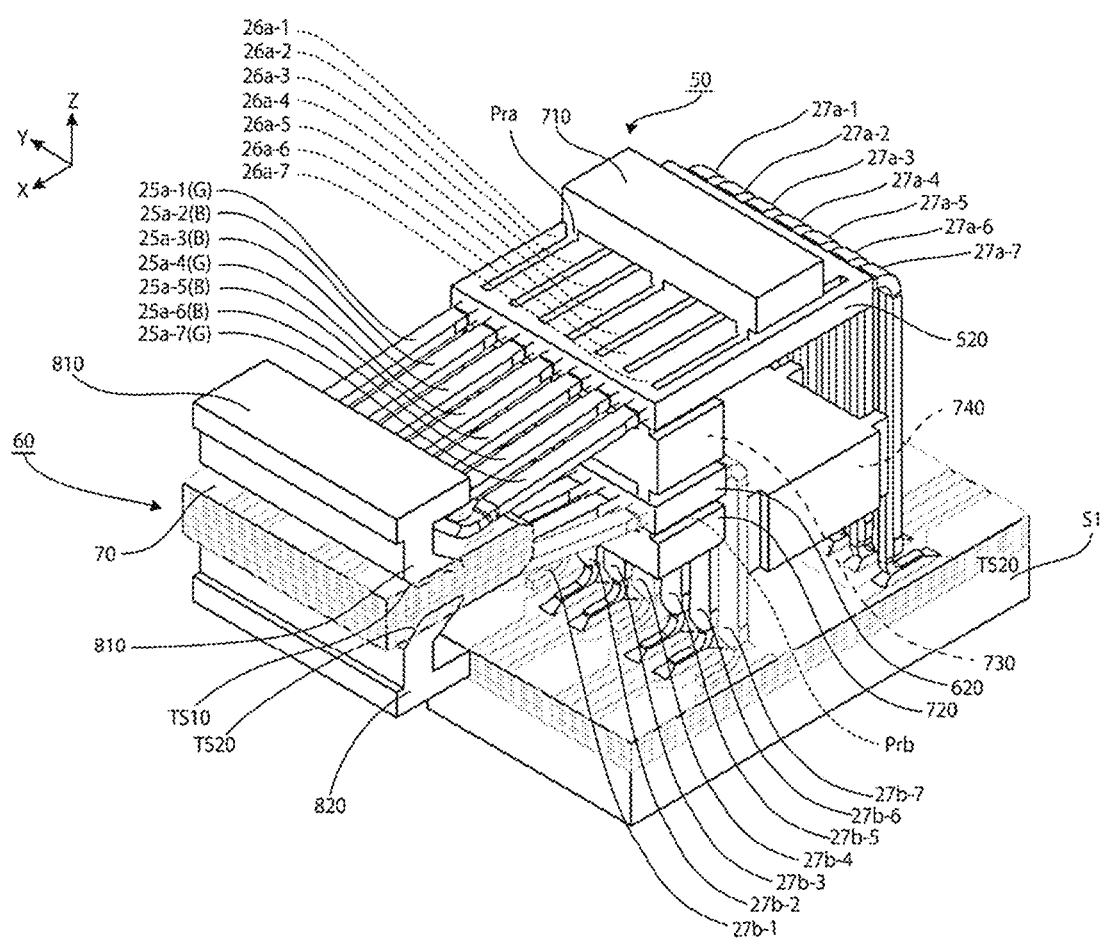
FIG. 3 is an example of a cross-sectional perspective view in which an elastic member has been further omitted from the cross-sectional perspective view shown in FIG. 2.

FIG. 1 is an example of a cross-sectional perspective view in which a high-speed transmission connector according to a first embodiment of the present disclosure is cut with an example of an optical transceiver along an inserting direction of the optical transceiver. FIG. 2 is an example of a cross-sectional perspective view in which a connector housing has been omitted from the cross-sectional perspective view in FIG. 1. FIG. 3 is an example of a cross-sectional perspective view in which an elastic member has been further omitted from FIG. 2.

A high-speed transmission connector 50 of the present embodiment is mounted on an external circuit board 51 and used. The high-speed transmission connector 50 includes: a connector housing 900 having an upper housing 700 and a lower housing 800 facing each other by sandwiching a slot 400 into which a module substrate 70 of an optical transceiver 60, which is a device of a communication partner, is fitted; contacts 11a-k (k=1 to 30) supported by the upper housing 700; and contacts 11b-k (k=1 to 30) supported by the lower housing 800. In cross-sectional perspective views of FIG. 1 to FIG. 3, out of thirty upper contacts and thirty lower contacts 11a-k and 11b-k, only seven upper contacts and seven lower contacts (k=1 to 7) are shown. In the present embodiment, the optical transceiver 60 and the module substrate 70 respectively correspond to an external communication device and a header defined in the scope of the Claims, for example. And the upper housing 700 and the lower housing 800 correspond, for example, to an upper plate portion and a lower plate portion defined in the scope of the Claims, respectively.

In the following description, a mounting direction of the high-speed transmission connector 50 with respect to the circuit board S1 is referred to as a Z direction, a direction in which the module substrate 70 of the optical transceiver 60 is fitted into the slot 400 of the high-speed transmission connector 50 is referred to as an X direction, and a direction orthogonal to both the Z direction and the X direction is referred to as a Y direction. In addition, the +Z side which is the side of the high-speed transmission connector 50 in the Z direction is appropriately referred to as an "upper side", and the −Z side which is the side of the circuit board is appropriately referred to as a "lower side". In addition, the +X side which is the side of the optical transceiver 60 in the X direction is appropriately referred to as a "front side", and the −X side which is the side of the high-speed transmission connector 50 is appropriately referred to as a "rear side". In addition, as viewed from the +X side, the +Y side is appropriately referred to as a "left side" and the −Y side is appropriately referred to as a "right side". In the drawings in general, the same or corresponding elements and members are designated by the same reference numerals, and duplicate description thereof will be omitted as appropriate in the present disclosure.

In addition, it should be noted that the shapes and sizes of the respective members shown in the drawings may not be consistent with the actual scale and ratio in order to appropriately enlarge, reduce or omit them for the purpose of facilitating explanation. In addition, the term "about" is used to include measurement errors. Ordinal terms such as "first", "second", etc., used below are merely identification symbols for distinguishing the same or corresponding components, and the same or corresponding components are not limited by these terms. In addition, in this specification, "connection" or "coupling" is a concept that includes not only the case of direct physical contact between the components in the contact relationship between the components, but also the case of indirect contact via an intermediate medium.

The contacts 11a-k (k=1 to 30) are arranged at a predetermined interval in the Y direction to form a first contact row. Similarly, the contacts 11b-k (k=1 to 30) are also arranged at a predetermined interval in the Y direction to constitute a second contact row.

The upper housing 700 and the lower housing 800, for example, have a convex portion and a concave portion (not shown) at positions corresponding to each other, and constitute a connector housing 900 as a whole by fitting these to each other.

A configuration example in which the connector housing 900 has been omitted from the high-speed transmission connector 50 is shown in the cross-sectional perspective view of FIG. 2. An example of the cross-sectional view in which an elastic member has been omitted from FIG. 2 is shown in FIG. 3. Further, a configuration example in which an elastic member, a part of the conductive resin and a circuit board are further omitted from the cross-sectional perspective view of FIG. 1 is shown in the cross-sectional perspective view of FIG. 4.

The contact 11a-k (k=1 to 30) has a receiving portion 21a-k (k=1 to 30) for sandwiching the module substrate 70 on the side, a first linear portion 25a-k (k=1 to 30), a second linear portion 26a-k (k=1 to 30), and a third linear portion 27a-k (k=1 to 30) The first linear portion 25a-k (k=1 to 30) extends obliquely upward and rearward from the rear end of the receiving portion 21a-k (k=1 to 30), the second linear portion 26a-k (k=1 to 30) extends from the rear end of the first linear portion 25a-k (k=1 to 30) toward the rear side of the high-speed transmission connector 50, and the third linear portion 27a-k (k=1 to 30) extends downward from the rear end of the second linear portion 26a-k (k=1 to 30).

Similarly, the contact 11 b-k (k=1 to 30) has a receiving portion 21b-k (k=1 to 30) for sandwiching the module substrate 70 on the module substrate side, a fourth linear portion 25b-k (k=1 to 30), a fifth linear portion 26b-k (k=1 to 30), and a sixth linear portion 27b-k (k=1 to 30). The fourth linear portion 25b-k (k=1 to 30) extends obliquely downward and rearward from the rear end of receiving portion 21 b-k (k=1 to 30), the fifth linear portion 26b-k (k=1 to 30) extends from the rear end of the fourth linear portion 25b-k (k=1 to 30) toward the rear side of the high-speed transmission connector 50, and the sixth linear portion 27b-k (k=1 to 30) extends downward from the rear end of the fifth linear portion 26b-k (k=1 to 30).

The high-speed transmission connector 50 further includes a first cap 810, a second cap 820, a first insert housing 520, a second insert housing 620 and conductive resins 710,720.

Figure 4:
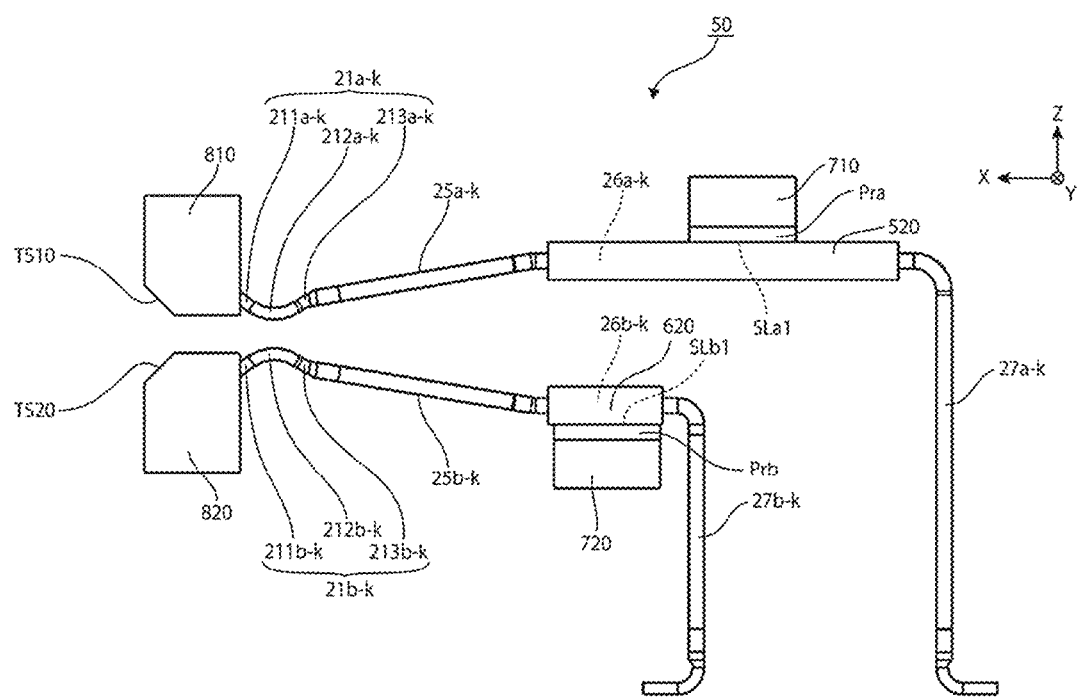
FIG. 4 is an example of a side view showing a configuration example in which a housing, an elastic member, a part of a conductive resin and a circuit board have been removed from the high-speed transmission connector shown in FIG. 1.
Figure 5:
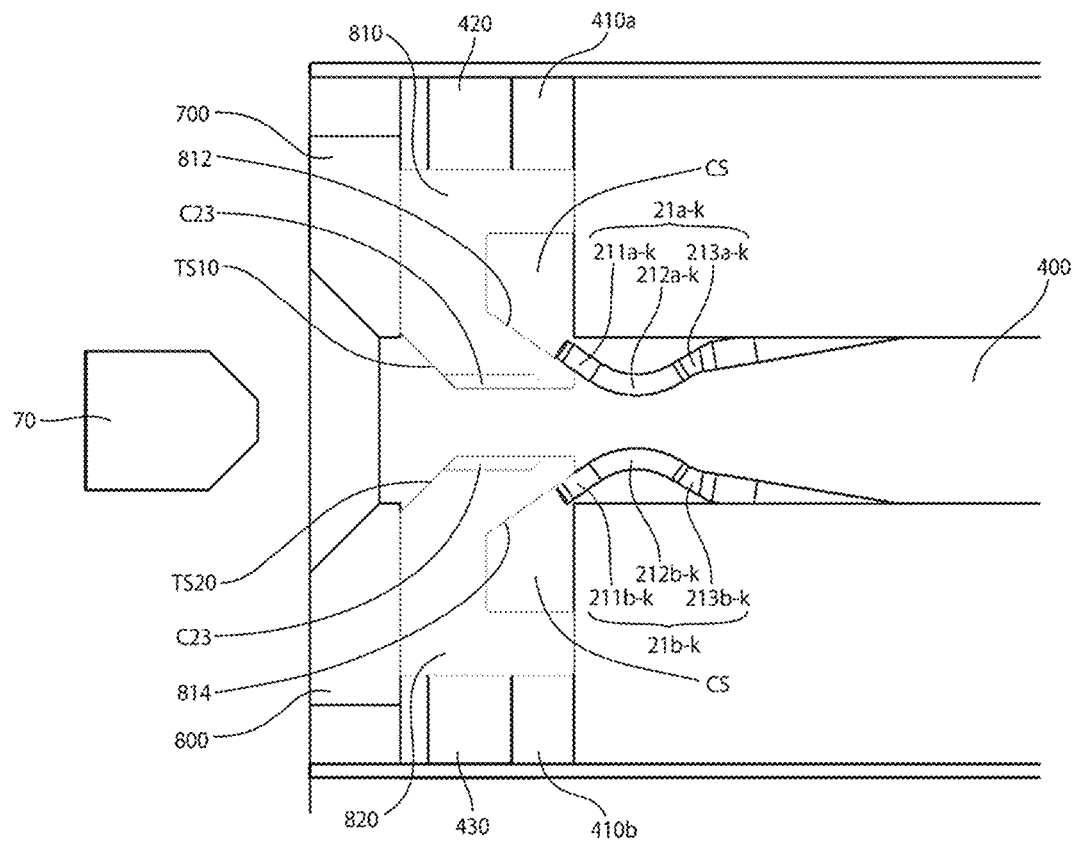
FIG. 5 is an example of a schematic cross-sectional view showing a position relationship between a receiving portion of a contact and a cap before inserting the optical transceiver in the high-speed transmission connector according to the first embodiment of the present disclosure.

As is clear by referring to FIG. 4 and FIG. 5 together, the first cap 810 and the second cap 820 have hollow structures opened on the sides of the contacts 11a-k,11b-k, and the hollow portions form accommodation spaces CS for hanging the receiving tip end portion of the receiving portion 21a-k (k=1 to 30) of the contact 11a-k, and the receiving tip end portion of the receiving portion 21b-k (k=1 to 30) of the contact 11b-k.

The first insert housing 520 supports the second linear portions 26a-k (k=1 to 30) of the contacts 11a-k of the first contact row, and the second insert housing 620 supports the fifth linear portions 26b-k (k=1 to 30) of the contacts 11b-k of the second contact row.

On the upper surface side of the first insert housing 520 and the lower surface side of the second insert housing 620, slits SLa1 and SLb1 are respectively provided (see FIG. 2 and FIG. 4) so that the upper surface of each contact 11a-k and the lower surface of each contact 11b-k are exposed corresponding to the position of each contact 11a-k and the position of each contact 11b-k. In the present embodiment, as for the contacts 11a-k (k=1 to 30), a set of one ground contact and two signal contacts is repeatedly arranged in the Y direction, and the ground contacts 11a-1 (G), 11a-4 (G), 11a-7 (G), 11a-10 (G), 11a-13 (G), 11a-18 (G), 11a-21 (G) 11a-24 (G), 11a-27 (G), 11a-30 (G) among contacts 11a-k are ground connected to each other via protrusion portions Pra of the conductive resin 710.

Similarly, also as for the contacts 11b-k (k=1 to 30), a set of one ground contact and two signal contacts is repeatedly arranged in the Y direction, and the ground contacts 11b-1 (G),11b-4 (G), 11b-7 (G), 11b-10 (G), 11b-13 (G), 11b-18 (G), 11b-21 (G), 11b-24 (G), 11b-27 (G), 11b-30 (G) among the contacts 11b-k are ground connected to each other via protrusion portions Prb of the conductive resin 720.

In the present embodiment, the protrusion portion Pra and the protrusion portion Prb correspond, for example, to the first convex portion and the second convex portion defined in the Claims.

Also from FIG. 4, the arrangement form of the first cap 810, the receiving portion 21a-k, the first linear portion 25a-k, the first insert housing 520, the second linear portion 26a-k, the third linear portion 27a-k and the conductive resin 710 can be seen, and the arrangement form of the second cap 820, the receiving portion 21 b-k, the fourth linear portion 25b-k, the second insert housing 620, the fifth linear portion 26b-k, the sixth linear portion 27b-k and the conductive resin 720 can be seen. It is to be noted that in FIG. 2 and FIG. 3, in order to show the arrangement relationship with the conductive resins 710,720 and the like in the present embodiment, conductive resins 730,740 respectively provided in two modification examples described later were drawn together as reference. Refer to the later description in the first modification example (explained with reference to FIG. 9 to FIG. 11) and the later description in the second modification example (explained with reference to FIG. 12 to FIG. 14) for the detailed configuration of these conductive resins.

Figure 6:
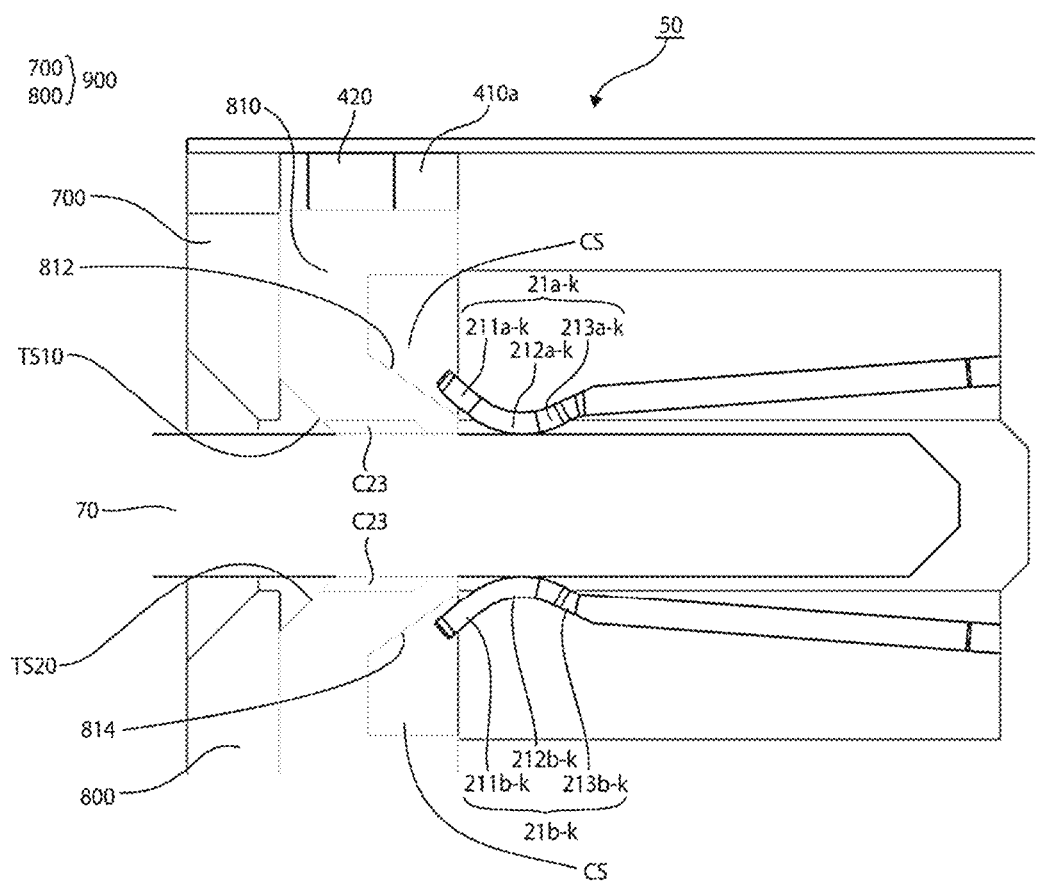
FIG. 6 is an example of a schematic cross-sectional view showing a state where the optical transceiver is sandwiched between the upper and lower contacts when the optical transceiver is inserted into the high-speed transmission connector shown in FIG. 5.

Here, as shown in FIG. 5 and FIG. 6, surfaces of the first cap 810 and the second cap 820 opposite to the module substrate 70 are provided with shallow concave portions C23 so as to correspond to the positions of the signal electrodes on the module substrate 70, thereby resulting in a structure in which the signal electrodes on the module substrate 70 are prevented from directly contacting the first cap 810 and the second cap 820. In the present embodiment, the concave portion C23 of the first cap 810 and the concave portion C23 of the second cap 820 correspond, for example, to the first concave portion and the second concave portion defined in the Claims.

Further, as shown in FIG. 4 and FIG. 5, a front lower corner portion of the first cap 810 and a front upper corner portion of the second cap 820 are chamfered so that the module substrate 70 can be smoothly inserted, thereby forming substrate side tapered surfaces TS10 and TS20.

Here, the detailed configuration of the receiving portion 21a-k and the receiving portion 21b-k in the present disclosure is described with reference to FIG. 4.

The respective receiving portions in the first contact and second contacts include: curved portions bent in an inverted arch shape and an arch shape and vertically adjacent to each other, which are portions as contact points with the wiring of an inserted external substrate; receiving tip end portions which are portions of the tip ends (on the module substrate side) rather than the curved portions; and receiving rear end portions which are portions from the curved portions to the first linear portions. For example, the receiving portion 21a-k (k=1 to 30) includes a receiving tip end portion 211a-k (k=1 to 30), a curved portion 212a-k (k=1 to 30) and a receiving rear end portion 213a-k (k=1 to 30). Similarly, the receiving portion 21b-k (k=1 to 30) includes a receiving tip end portion 211b-k (k=1 to 30), a curved portion 212b-k (k=1 to 30) and a receiving rear end portion 213b-k (k=1 to 30).

Figure 7:
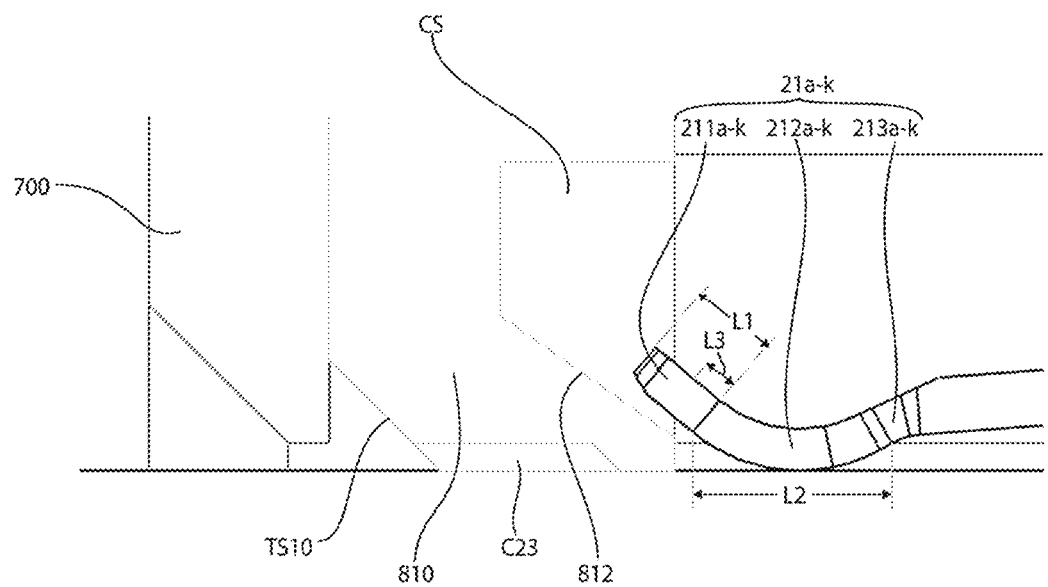
FIG. 7 is an example of a partially enlarged view of the schematic cross-sectional view shown in FIG. 6.

FIG. 7 shows an example of a partially enlarged view of the schematic cross-sectional view shown in FIG. 6. In the high-speed transmission connector 50 of the present embodiment, a length L1 of the receiving tip end portion 211a-k is equal to or shorter than a length L2 of the curved portion 212a-k. More specifically, if the length of the receiving tip end portion 211a-k along the central axis of the receiving tip end portion 211a-k itself is L1, the length of the curved portion 212a-k in a direction parallel to the top surface of the housing 900 is L2, and in the receiving tip end portion 211a-k, the distance from the boundary with the curved portion 212a-k to the accommodation space is L3, there is a relationship as follows:

$$L2 \geq L1 \geq 0.3L2 (\approx L3)$$

In addition, as shown in FIG. 5 and FIG. 6, in a region inside the connector housing 900, holes 410a and 410b are provided in regions above and below the slot 400 on the module substrate side, and the first cap 810 and the second cap 820 are accommodated and supported within these holes 410a,410b, respectively. The first cap 810 and the second cap 820 have wall surfaces 812 and 814 for respectively hanging the receiving tip end portions 211a-k and 211b-k within the respective accommodation spaces CS, and these wall surfaces 812 and 814 are inclined at a predetermined angle with respect to the inserting direction of the module substrate 70 corresponding to the shapes of the receiving tip end portions 211a-k, 211b-k.

In addition, as shown in FIG. 1 and FIG. 2, an elastic member 420 for urging the first cap 810 downward from its upper surface is provided above the first cap 810 in the hole 410a, and similarly, an elastic member 430 for urging the second cap 820 upward from its lower surface is provided below the second cap 820 in the hole 410b. For example, return springs can be used as the elastic members 420,430, but it is not limited to this, and any elastic member capable of urging the cap from above and below may be used.

The schematic cross-sectional view of FIG. 6 shows a state where the optical transceiver 60 is inserted into the high-speed transmission connector 50. The module substrate 70 is in contact with the first cap 810 and the second cap 820 and slides on these substrate side tapered surfaces TS10, TS20, thereby, it pushes and widens the first cap 810 and the second cap 820 as well as the receiving portions of the first contact row and the second contact row up and down as it advances, and the electrodes on the module substrate 70 are connected to the curved portions 212a-k and 212b-k.

Here, in a state before inserting the module substrate 70, there are slight gaps between the receiving tip end portion 211a-k and the wall surface 812, and between the receiving tip end portion 211b-k and the wall surface 814, and through the gaps, the receiving tip end portion 211a-k faces the wall surface 812 and the receiving tip end portion 211b-k faces the wall surface 814. But when the module substrate 70 is fitted between the first contact row and the second contact row, these gaps are narrowed, and the receiving tip end portion 211a-k and the wall surface 812 may come into close contact with each other, and the receiving tip end portion 211b-k and the wall surface 814 may come into close contact with each other. In that case, crosstalk could be adversely affected. In the high-speed transmission connector 50 of the present embodiment, since the first cap 810 and the second cap 820 are restrained downward and upward by urging of the elastic members 420,430, it is possible to avoid the situation where the gaps disappear as shown in the partially enlarged view of FIG. 7.

Thus, in addition to preventing upward movement of the first cap 810 and downward movement of the second cap 820 by the elastic members 420, 430, respectively, means for preventing downward movement and upward movement in opposite directions may be provided in order to stably hold the first cap 810 and the second cap 820. The high-speed transmission connector 50 of the present embodiment further includes cap stoppers 440, 460. That is, as shown in FIG. 1, steps LD2, LD4 are provided on a side surface of the hole 410 on a side opposite to the side where the elastic member 420 is located on the inner wall of the hole 410a (see FIG. 5) of the upper housing 700, and these constitute a cap stopper 440 that prevents the downward movement of the first cap 810. Similarly, steps LD6, LD8 that prevent the upward movement of the second cap 820 are also provided on the inner wall of the hole 410b (see FIG. 5) accommodating the second cap 820, and constitute a cap stopper 460.

Figure 8:
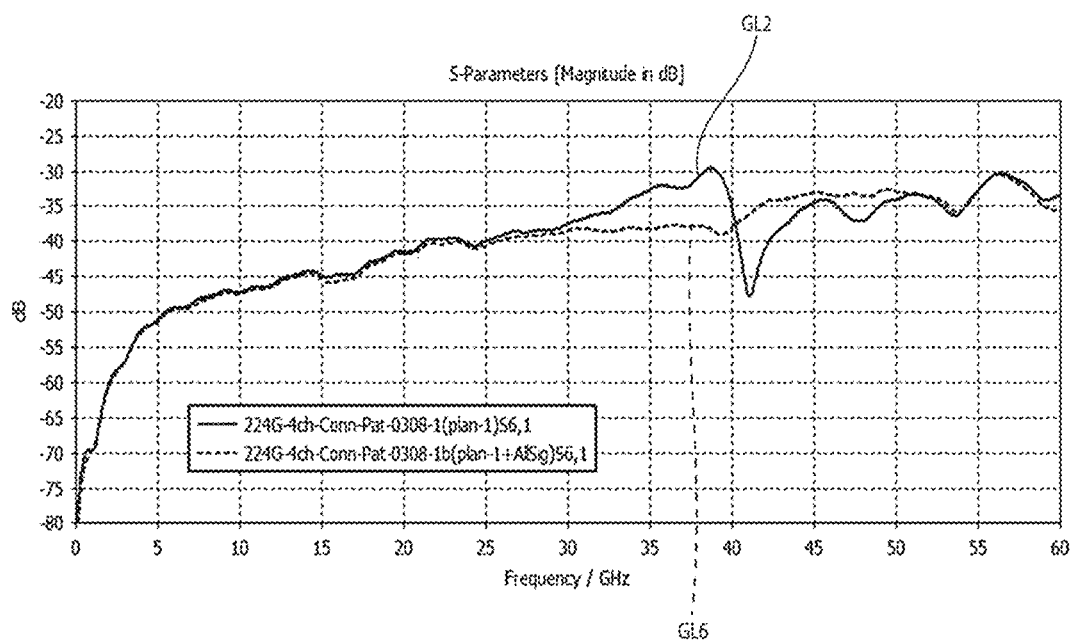
FIG. 8 is a graph showing an example of a result of simulating crosstalk (FEXT) of the high-speed transmission connector of the first embodiment.

FIG. 8 is a graph showing an example of a result of simulating crosstalk (FEXT) of the high-speed transmission connector 50 of the present embodiment. The graph indicated by symbol GL6 in FIG. 8 shows crosstalk due to the high-speed transmission connector 50 of the present embodiment. It is to be noted that in FIG. 8, the graph indicated by symbol GL2 shows crosstalk due to an example of the high-speed transmission connector in which the receiving tip end portion of the ground contact is longer than the curved portion, and the receiving tip end portion of the signal contact is shorter than the curved portion.

According to the high-speed transmission connector 50 of the present embodiment, since the length of the receiving tip end portion 211a-k is equal to or shorter than the length of the curved portion 212a-k for both the signal contact and the ground contact, it is seen that crosstalk can be suppressed to a level not higher than a certain level up to a frequency band of 60 GHz in the graph indicated by symbol GL6, as shown in FIG. 8.

It is to be noted that although not shown here, for both the signal contact and the ground contact, any of the above examples is more advantageous for suppressing crosstalk than when the receiving tip end portion is made longer than the curved portion. That is, it is preferable to at least make the receiving tip end portion of the signal contact shorter than the curved portion.

As describe above, according to the present embodiment, a high-speed transmission connector with a good transmission performance in a high frequency range is provided.

Further, a smoother and more stable electrical connection with an external device is also possible.

Here, in the embodiment described above, a case where conductive resins 710,720 are provided on the upper surface side of the first insert housing 520 and the lower surface side of the second insert housing 620 is taken and described, but it is not limited thereto, and conductive resins can be installed in various forms.

Hereinafter, other installation examples of conductive resins will be described with reference to FIG. 9 to FIG. 14 as modification examples of the present embodiment. Below, a case where the first contact row and the second contact row each have thirty contacts 11a-k (k=30) and 11b-k (k=30) is taken up. It is to be noted that the following modification examples are similarly applicable not only to the first embodiment, but also the second embodiment described later.

Figure 9:
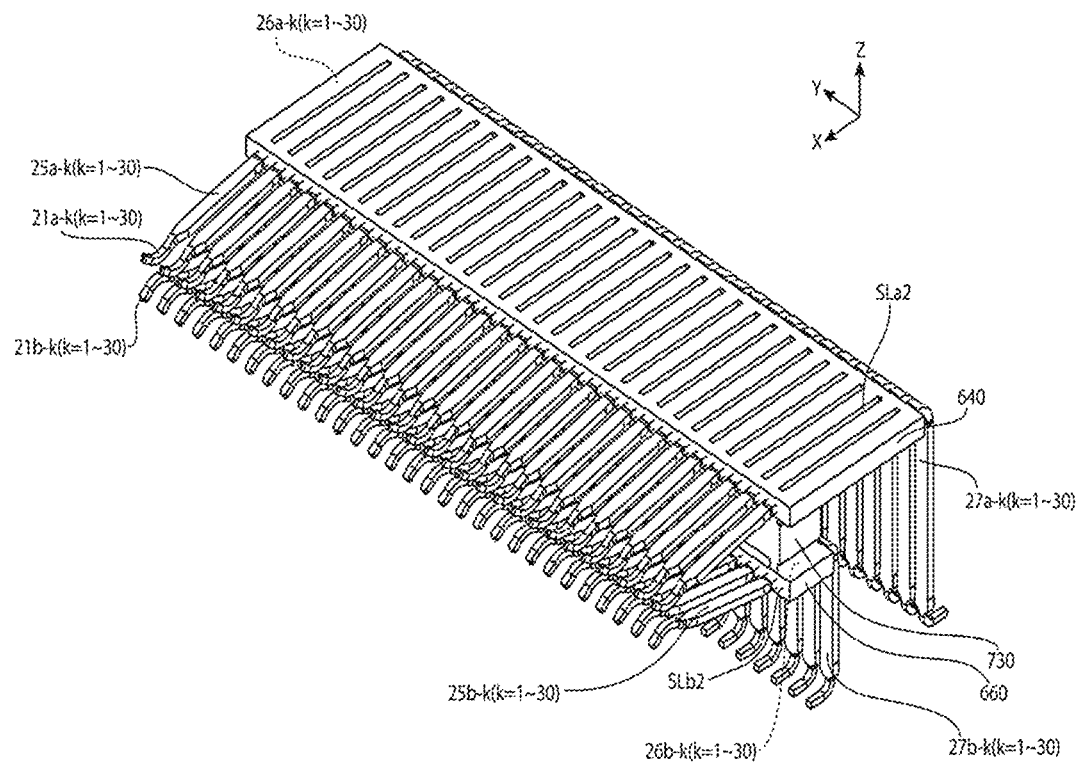
FIG. 9 is an example of a schematic perspective view showing a first modification example including a conductive resin that is in contact with ground contacts in a first insert housing and ground contacts in a second insert housing.
Figure 10:
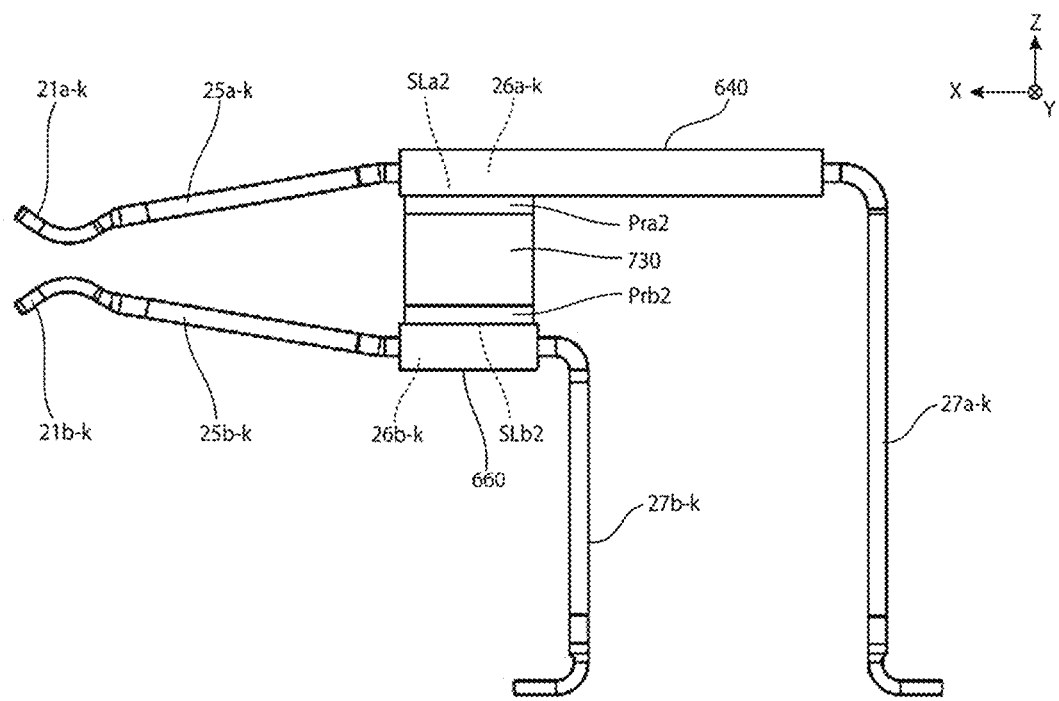
FIG. 10 is an example of a side view of the first modification example shown in FIG. 9.
Figure 11:
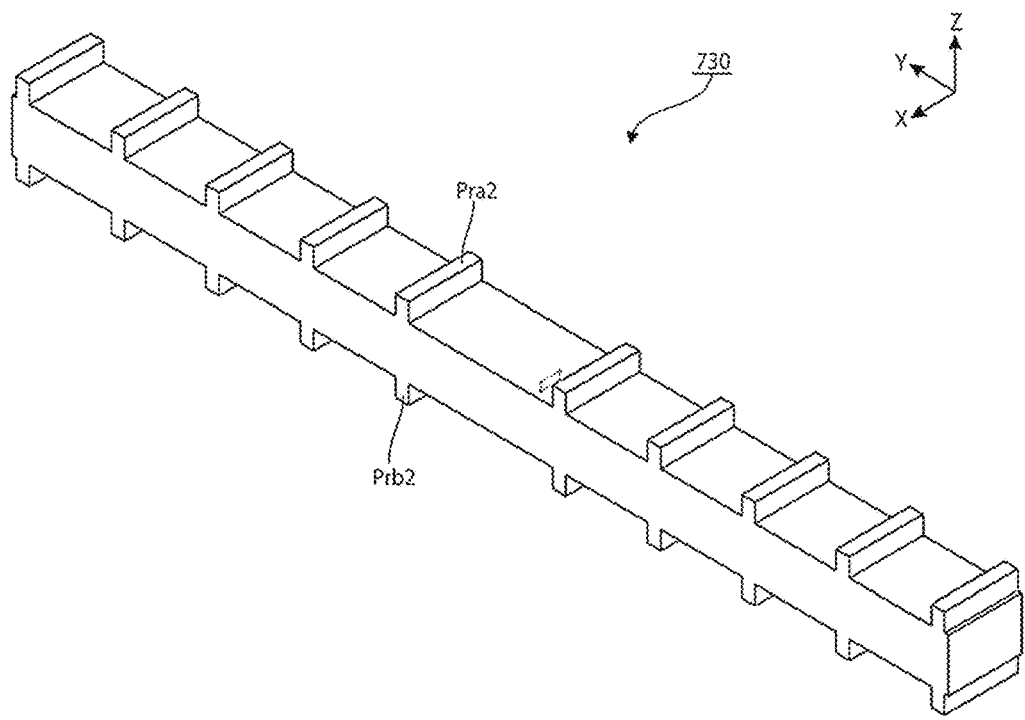
FIG. 11 is an example of a perspective view of the conductive resin show in FIG. 9.

The first modification example shown in FIG. 9 to FIG. 11 shows an example in which a conductive resin 730 arranged between a first insert housing 640 and a second insert housing 660 and connecting the ground contacts of the first contact row and the ground contacts of the second contact row to each other is provided. As shown in FIG. 11, a plurality of protrusion portions Pra2 protruding upward and a plurality of protrusion portions Prb2 protruding downward are provided on the upper surface and the lower surface of the conductive resin 730. The protrusion portions Pra2 are in contact with the ground contacts within the first insert housing 640 through slits SLa2 provided in the lower surface of the first insert housing 640, and the protrusion portions Prb2 are in contact with the ground contacts within the second insert housing 660 through slits SLb2 provided in the upper surface of the second insert housing 660.

In this modification example, the protrusion portion Pra2 and the protrusion portion Prb2 correspond, for example, to the first convex portion and the second convex portion defined in the Claims.

Figure 12:
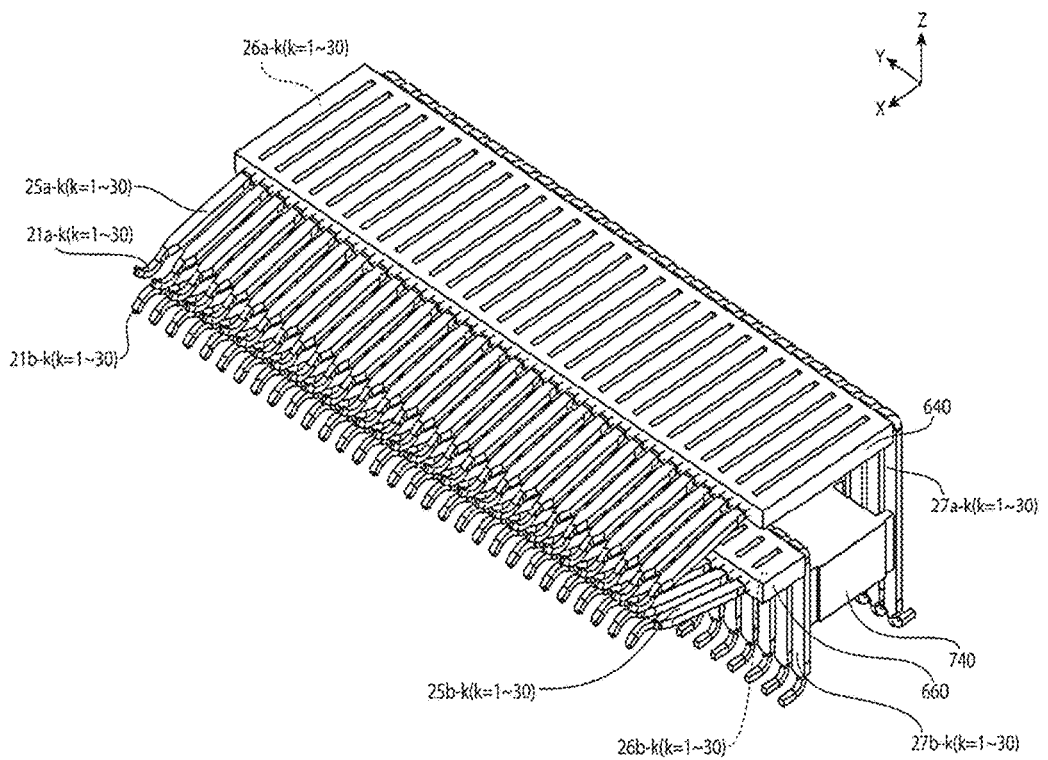
FIG. 12 is an example of a schematic perspective view showing a second modification example including a conductive resin arranged between third linear portions of the first contact row and sixth linear portions of the second contact row.
Figure 13:
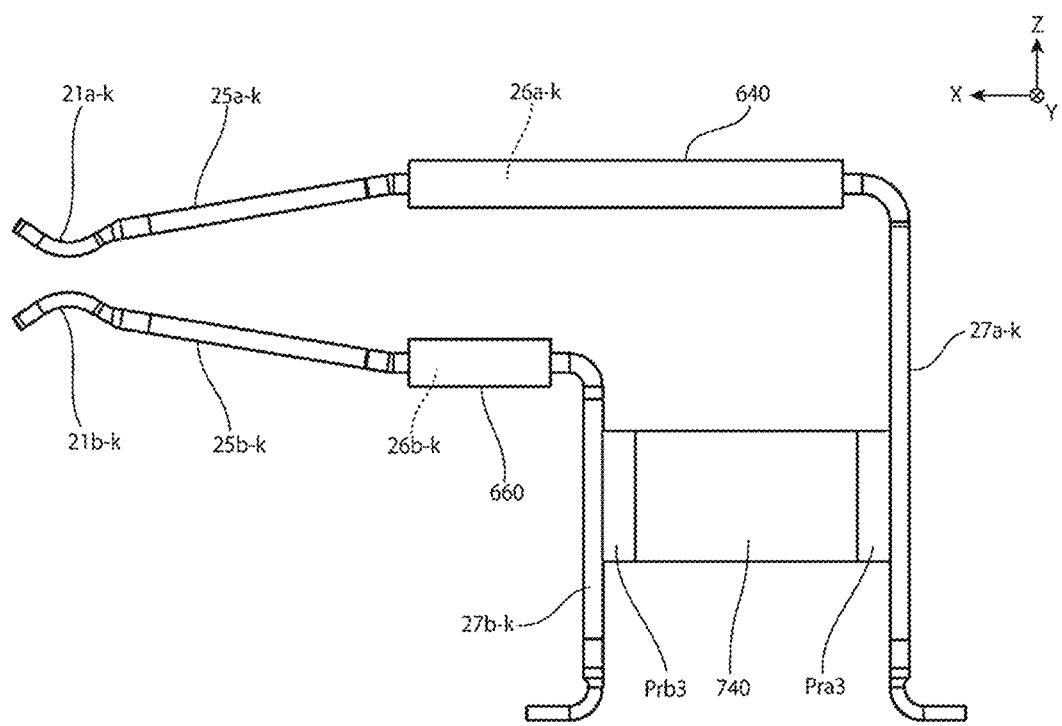
FIG. 13 is an example of a side view of the second modification example shown in FIG. 12.
Figure 14:
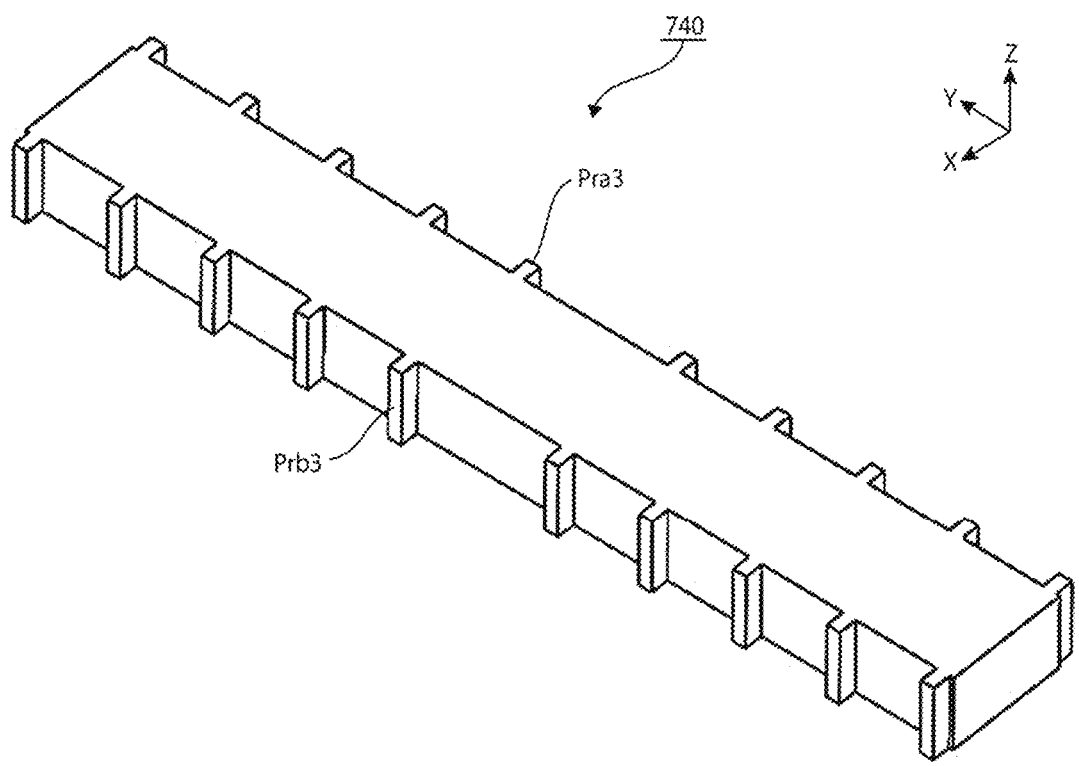
FIG. 14 is an example of a perspective view of the conductive resin show in FIG. 12.

The second modification example shown in FIG. 12 to FIG. 14 shows an example in which a conductive resin 740 arranged between the third linear portions of the first contact row and the sixth linear portions of the second contact row and connecting the ground contacts of the first contact row and ground contacts of the second contact row to each other is provided. As shown in FIG. 14, a plurality of protrusion portions Pra3 protruding rearward and a plurality of protrusion portions Prb3 protruding forward are provided on the rear surface and the front surface of the conductive resin 740, respectively. The protrusion portions Pra3 are in contact with the third linear portions 27a-k (k=1 to 30) of the contacts 11a-k (k=1 to 30), and the protrusion portions Prb3 are in contact with the sixth linear portions 27b-k (k=1 to 30) of the contacts 11b-k (k=1 to 30). In this modification example, the protrusion portion Pra3 and the protrusion portion Prb3 correspond, for example, to the first convex portion and the second convex portion defined in the Claims.

(2) Second Embodiment

The second embodiment of the present disclosure will be described with reference to FIG. 15 to FIG. 19.

Figure 15:
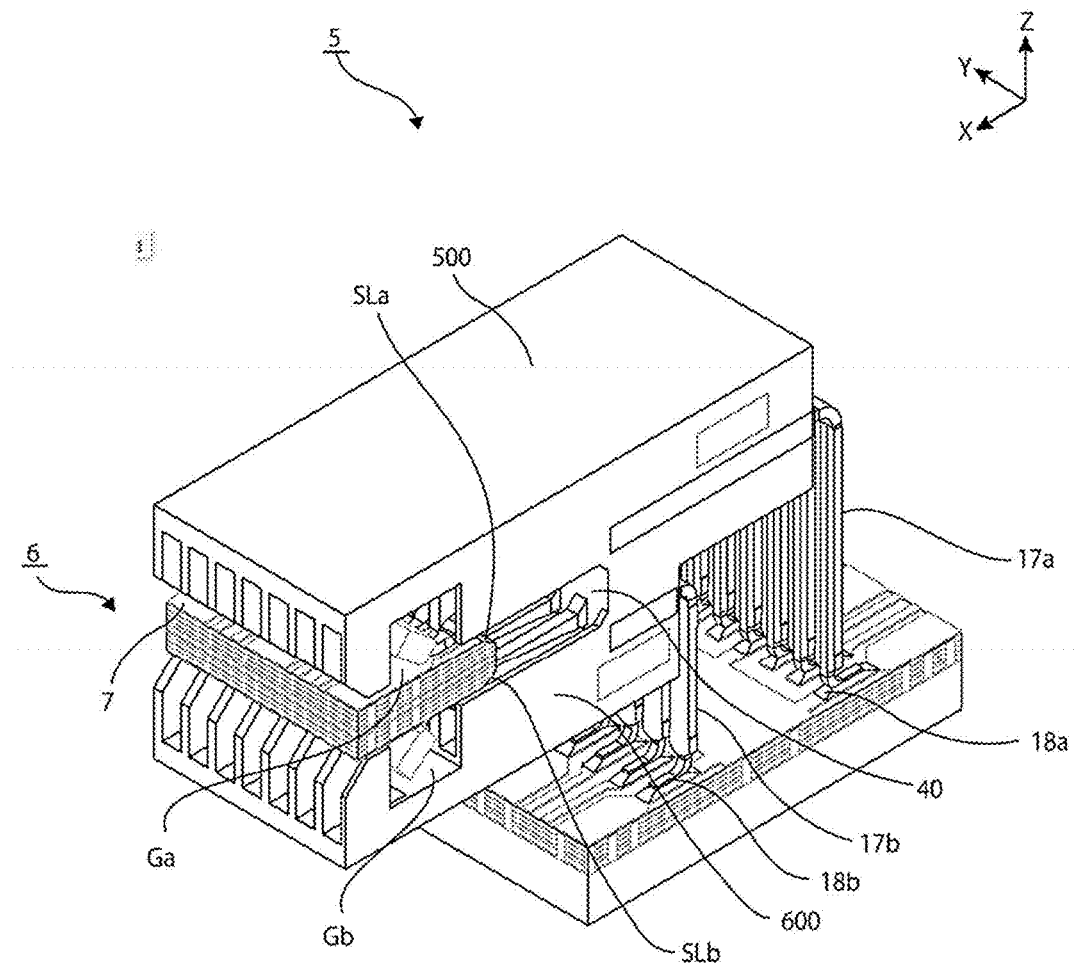
FIG. 15 is an example of a cross-sectional perspective view showing a high-speed transmission connector according to a second embodiment of the present disclosure along with an example of an optical transceiver.
Figure 16:
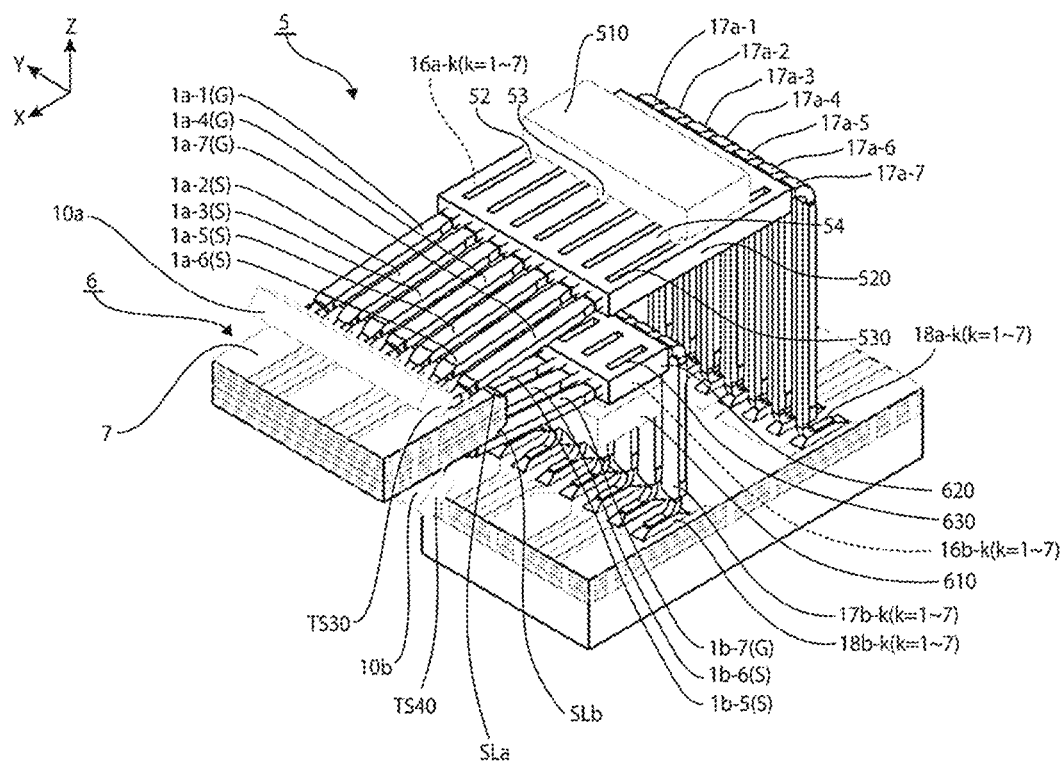
FIG. 16 is an example of a cross-sectional perspective view showing that a connector housing has been omitted from the configuration shown in FIG. 15.

As shown in FIG. 15 and FIG. 16, the high-speed transmission connector 5 of the present embodiment includes: a connector housing including an upper housing 500 and a lower housing 600; a row of contacts 1a-k (k=1 to 7); a row of contacts 1b-k (k=1 to 7); a first insert housing 520; a second insert housing 620; and conductive resins 510,610. The contacts 1a-k (k=1 to 7) and the contacts 1b-k (k=1 to 7) correspond, for example, to the first contact and the second contact described in the Claims, respectively. The row of contacts 1a-k (k=1 to 7) and the row of contacts 1b-k (k=1 to 7) correspond to the first contact row and the second contact row, respectively. The upper housing 500 supports the contacts 1a-k (k=1 to 7) and the lower housing 600 supports the contacts 1b-k (k=1 to 7). Although not shown in particular, the upper housing 500 and the lower housing 600, for example, have a convex portion and a concave portion at positions corresponding to each other, and constitute a connector housing as a whole by fitting these. A slot 40 is provided on one side of the upper housing 500 and the lower housing 600 for inserting and connecting a header of an external communication device. In the present embodiment, the upper housing 500 and the lower housing 600 correspond, for example, to the upper plate portion and the lower plate portion described in the Claims.

An optical transceiver 6 as an external communication device is also illustrated in FIG. 15 and FIG. 16. The optical transceiver 6 has a stick-like module substrate 7. The rear side (side inserted into the high-speed transmission connector 5) of the module substrate 7 is chamfered to form inclined surfaces SLa and SLb so that fitting into the slot 40 of the high-speed transmission connector 5 becomes easy.

The contacts 1a-k (k=1 to 7) and 1b-k (k=1 to 7) are formed by bending several locations of a rod-shaped metal piece. As shown in FIG. 15 and FIG. 16, these contacts 1a-k (k=1 to 7) and 1b-k (k=1 to 7) are arranged side by side at equal intervals so as to form rows in the left and right (±Y direction).

Each of the contacts 1a-k (k=1 to 7) and 1b-k (k=1 to 7) is arranged by extending in the front and rear (±X direction), and the front and rear dimensions of these have a relationship of contact 1a-k>contact 1b-k.

Figure 17:
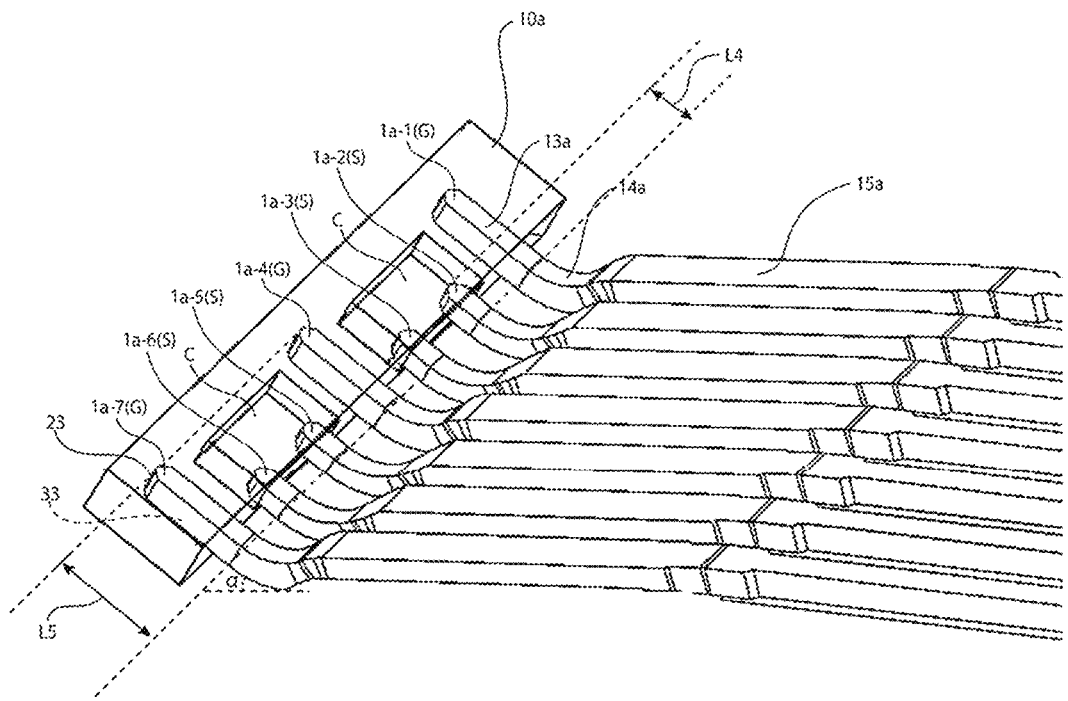
FIG. 17 is an example of a perspective view showing a detailed configuration of receiving portions of an upper contact row and a first cap of the high-speed transmission connector shown in FIG. 15.

Referring also to FIG. 17, the contact 1a-k has a receiving portion at the tip end on the module substrate 7 side, a first linear portion 15a extending obliquely upward and rearward from the rear end of the receiving portion, a second linear portion 16a extending from the rear end of the first linear portion 15a toward the rear side of the high-speed transmission connector 5, a third linear portion 17a extending downward from the rear end of the second linear portion 16a, and a substrate side contact portion 18a extending rearward from the lower end of the third linear portion 17a. The receiving portion has a receiving tip end portion 13a, and a curved portion 14a continuously extending from the rear end of the receiving tip end portion 13a and bent in an inverted arch shape. Although not specifically illustrated, the contact 1b-k similarly has a receiving tip end portion 13b, a curved portion 14b continuously extending from the rear end of the receiving tip end portion 13b and bent in an arch shape, a fourth linear portion 15b extending obliquely upward and rearward from the rear end of the curved portion 14b, a fifth linear portion 16b extending from the rear end of the fourth linear portion 15b toward the rear side of the high-speed transmission connector 5, a sixth linear portion 17b extending downward from the rear end of the fifth linear portion 16b, and a substrate side contact portion 18b extending forward from the lower end of the sixth linear portion 17b.

Among contacts 1a-k (k=1 to 7) and 1b-k (k=1 to 7), contacts 1a-1 and 1b-1 at the left end, number four contacts 1a-4 and 1b-4 from the left end, and number seven contacts 1a-7 and 1b-7 from the left end are ground contacts that come into contact with ground pads GND of the module substrate 7.

Further, number two contacts 1a-2 and 1b-2 from the left end, number three contacts 1a-3 and 1b-3 from the left end, number five contacts 1a-5 and 1b-5 from the left end, and number six contacts 1a-6 and 1b-6 from the left end are signal contacts that come into contact with signal pads SIG of the module substrate 7.

Thereafter, as appropriate, letters (G) are attached to the ground contacts 1a-k and 1b-k that come into contact with the ground pads GND, and letters (S) are attached to the signal contacts 1a-k and 1b-k that come into contact with the signal pads SIG to distinguish between the two.

As shown in FIG. 15, the upper housing 500 is composed of a rectangular frame, and supports the contacts 1a-k at the bottom surface thereof. A space Ga capable of sufficiently accommodating the receiving portions is provided on the front side (+X side) of the upper housing 500. It is to be noted that in FIG. 15, openings are provided corresponding to the contacts 1a-k (k=1 to 7), respectively, in the front side wall of the upper housing 500, and also, openings are provided corresponding to the space Ga at the front portions of the left and right side walls to contribute to heat dissipation, but these are not essential and do not need to be specifically provided.

The lower housing 600 is composed of a rectangular frame opened upward, and supports the contacts 1b-k on the bottom surface side thereof. A space Gb capable of sufficiently accommodating the receiving portions is also provided on the front side of the lower housing 600. Openings are also provided at the front portions of the left and right walls of the lower housing 600 to contribute to heat dissipation, but these are also not essential configurations, and there is no need to specifically provide them.

As shown by symbol 520 in FIG. 16, the upper housing 500 includes a first insert housing 520 that accommodates the second linear portions 16a of the contacts 1a-k (k=1 to 7). The first insert housing 520 are provided with slits 530 corresponding to the positions of the second linear portions 16a. A conductive resin 510 is arranged on the first insert housing 520. The lower surface of the conductive resin 510 are provided with convex portions 52, 53, 54, and the respective tip ends are fitted into the slits 530 and are in contact with the second linear portions 16a of the contacts 1a-1 (G), 1a-4 (G) and 1a-7 (G) from above. In the present embodiment, the convex portions 52, 53, 54 correspond, for example, to the first convex portion defined in the Claims.

Figure 18:
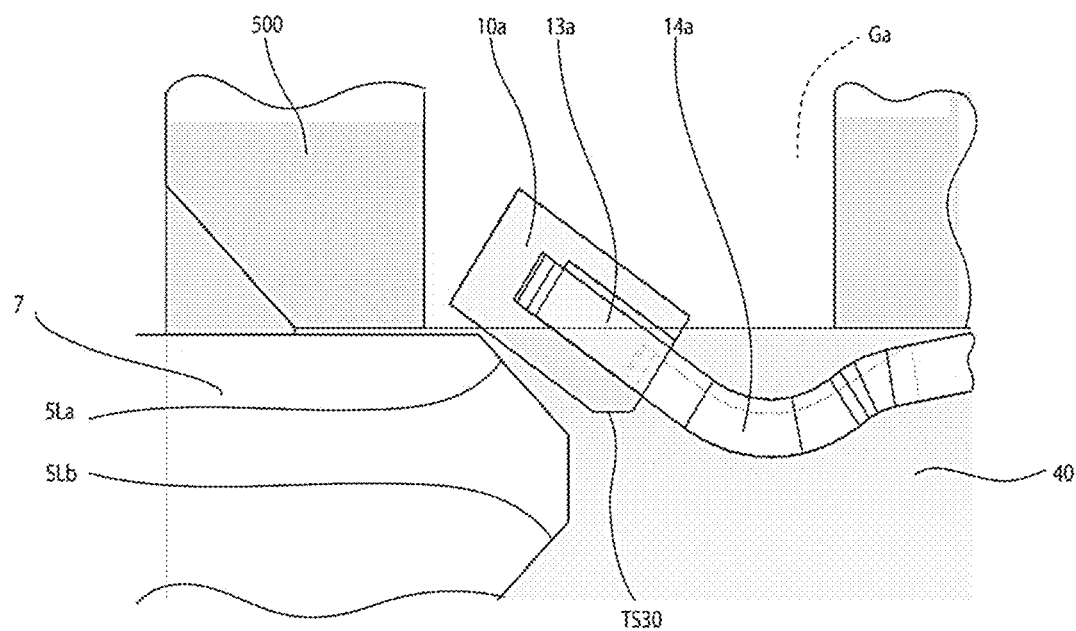
FIG. 18 is an example of an enlarged view for explaining the operation of the receiving portion in the upper contact row and the first cap immediately before inserting the optical transceiver into the high-speed transmission connector of the second embodiment.

Similarly, the lower housing 600 includes an insert housing 620 that accommodates the fifth linear portions 16b of the contacts 1b-k (k=1 to 7). The insert housing 620 are provided with slits 630 corresponding to the positions of the fifth linear portions 16b. A conductive resin 610 is provided directly below the insert housing 620. The upper surface of the conductive resin 610 are also provided with convex portions (for example, corresponding to the second convex portion defined in the Claims), and the respective tip ends are fitted into the slits 630 and are in contact with the fifth linear portions 16b of the contacts 1b-1 (G), 1b-4 (G) and 1b-7 (G) from below. Here, the tip structure of the contact 1a-k (k=1 to 7) will be described in more detail with reference to FIG. 17 and FIG. 18. As described above, the contact 1a-k has a receiving portion including a curved portion 14a and a receiving tip end portion 13a. The receiving tip end portion 13a is formed to be inclined obliquely upward so as to be in contact with the curved portion 14a and form an acute angle α)(<90° with respect to a surface parallel to the top surface of the upper housing 500 or the bottom surface of the lower housing 600. As shown in FIG. 17, for the contacts 1a-k, there is a first cap 10a that fixes the receiving tip end portions 13a so as to integrally connect them in the row direction. The receiving tip end portions 13a of contacts 1a-1 (G), 1a-4 (G) and 1a-7 (G) are at least partially embedded in the first cap 10a. Meanwhile, the first cap 10a are provided with concave portions at positions corresponding to the contacts 1a-2 (S), 1a-3 (S), 1a-5 (S) and 1a-6 (S), respectively, to constitute accommodation spaces C. The length L4 of the respective receiving tip end portions 13a of the signal contacts 1a-2 (S), 1a-3 (S), 1a-5 (S) and 1a-6 (S) is shorter than the length L5 of the receiving tip end portions 13a of the ground contacts 1a-1 (G), 1a-4 (G) and 1a-7 (G) (L4<L5), and the respective receiving tip end portions 13a of the signal contacts 1a-2 (S), 1a-3 (S), 1a-5 (S) and 1a-6 (S) are in contact with the bottom surfaces of the concave portions that constitute the accommodation spaces C, respectively, or are arranged in the accommodation spaces C so as to face each other through gaps. FIG. 18 shows an example in which each receiving tip end portion is in contact with the bottom surface of the concave portion.

It is to be noted that the attachment of the receiving tip end portion 13a to the first cap 10a can be realized by, for example, providing a protrusion portion 23 at the tip end of the receiving tip end portion 13a of the ground contact, drilling a pore 33 at a position corresponding to the protrusion portion 23 in the first cap 10a, and pressing the receiving tip end portion 13a into the pore 33 via the protrusion portion 23.

In addition, although not shown in particular, a second cap 10b that integrally fixes the receiving tip end portions 13b of the ground contacts so as to connect the contacts 1b-k in the row direction is also provided for the contacts 1b-k. The receiving tip end portions 13b of the ground contacts 1b-1 (G), 1b-4 (G) and 1b-7 (G) are at least partially embedded in the second cap 10b, and the second cap 10b is provided with concave portions at positions corresponding to the signal contacts 1b-2 (S), 1b-3 (S), 1b-5 (S) and 1b-6 (S), respectively, to constitute accommodation spaces C. The length L4 of the respective receiving tip end portions 13b of the signal contacts 1b-2 (S), 1b-3 (S), 1b-5 (S) and 1b-6 (S) is shorter than the length L5 of the receiving tip end portions 13b of the ground contacts 1b-1 (G), 1b-4 (G) and 1b-7 (G) (L4<L5), and the respective receiving tip end portions 13b of the signal contacts 1b-2(S), 1b-3 (S), 1b-5 (S) and 1b-6 (S) are in contact with the bottom surfaces of the concave portions that constitute the accommodation spaces C, respectively, or are arranged in the accommodation spaces C through gaps.

The functions of the first cap 10a and the second cap 10b are as follows.

That is, when a user inserts the module substrate 7 into the slot 40 of the high-speed transmission connector 5 in order to connect the optical transceiver 6 to the high-speed transmission connector as shown in FIG. 18, the module substrate 7 moves smoothly and gently while contacting the first cap 10a at the inclined surface SLa of the tip end of the module substrate 7 and pushing upward the first cap 10a and the receiving tip end portions 13a of the first contact row engaged with the first cap 10a to widen the gap between the first contact row and the second contact row, and a portion thereof is accommodated in the space Ga of the upper housing 500. When insertion of the module substrate 7 into the slot 40 is carried out, a state where the respective receiving tip end portions of the signal contacts 1a-2 (S), 1a-3 (S), 1a-5 (S) and 1a-6 (S) are in contact with the bottom surfaces of the concave portions providing the accommodation spaces C, or are slightly separated from the bottom surfaces due to the warpage effect of the module substrate is maintained. When the optical transceiver 6 is removed from the high-speed transmission connector 5, the first cap 10a moves gently downward along the inclined surface SLa of the tip end of the module substrate 7 and returns to the original state. It is to be noted that although it is omitted in FIG. 17, similar to the first embodiment described above, as shown in FIG. 18, it is preferable that the lower rear corner portion of the first cap 10a is chamfered to form a tapered surface TS30 so that the module substrate 7 can be smoothly inserted.

Although it is omitted in FIG. 18, similarly for the second cap 10b, when the module substrate 7 is inserted into the slot 40 of the high-speed transmission connector 5, the module substrate 7 moves smoothly and gently while pushing downward the second cap 10b and the receiving tip end portions 13b of the second contact row engaged with the second cap 10b by the inclined surface SLb of the tip end of the module substrate 7 to widen the gap between the first contact row and the second contact row, and a portion thereof is accommodated in the space Gb of the lower housing 600. When the optical transceiver 6 is removed from the high-speed transmission connector 5, the second cap 10b moves gently upward along the inclined surface SLb of the tip end of the module substrate 7 and returns to the original state. In addition, similar to the tapered surface TS30 of the first cap 10a, the upper rear corner portion of the second cap 10b is also chamfered to form a tapered surface TS40 (see FIG. 16) so that the module substrate 7 can be smoothly inserted.

Since the function of the second cap 10b is similar to that of the first cap 10a described above, repetitive description is omitted.

Thus, according to the high-speed transmission connector 5 of the present embodiment, both for the first contact row and the second contact row, the length L4 of the respective receiving tip end portions 13a, 13b of the signal contacts is shorter than the length L5 of the respective receiving tip end portions 13a, 13b of the ground contacts (L4<L5), so the generation of noise in the signal contacts can be reduced, and the increase in insertion loss can be suppressed.

In addition, since there are the first cap 10a and the second cap 10b attached to the receiving tip end portions 13a,13b of the first contact row and the second contact row and supported by the respective ground contacts, deformation or damage of the contact pin in the receiving tip end portion of each contact is prevented even if the module substrate 7 of the optical transceiver 6 is repeatedly inserted and removed, and thus reliable electrical contact can be maintained, so the prolongation of product life can be achieved.

Next, the contribution of the connector to the transmission performance by the above structure will be described in more detail.

Figure 19:
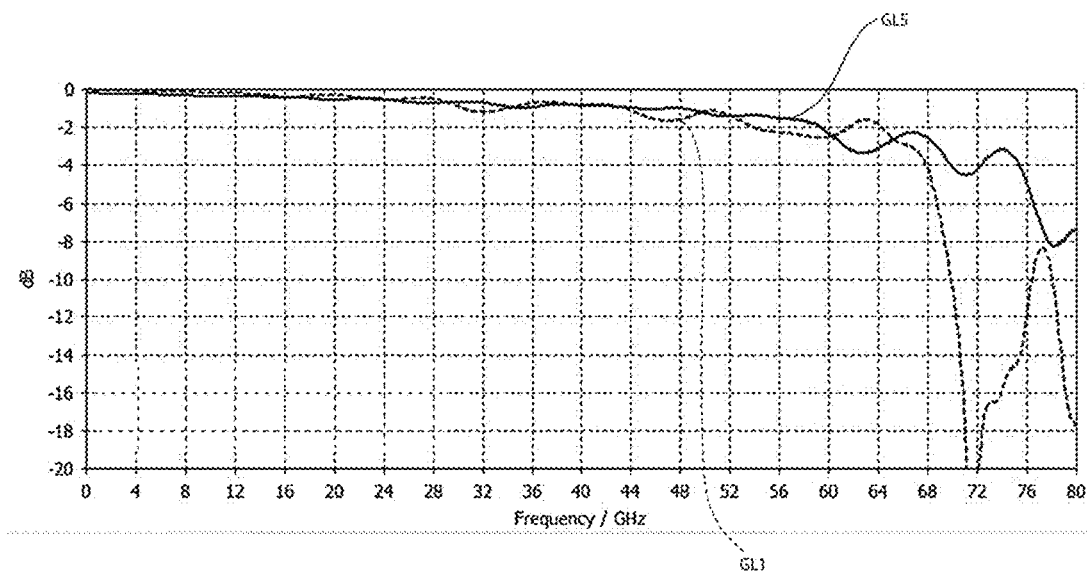
FIG. 19 is a graph showing an example of a result of simulating insertion loss in the high-speed transmission connector of the second embodiment and optical transceiver.

FIG. 19 is a graph showing an example of a result of simulating insertion loss in the high-speed transmission connector 5 of the present second embodiment and the optical transceiver 6. In FIG. 19, the dashed line graph indicated by symbol GL1 shows insertion loss due to an example of a conventional high-speed connector, and the solid line graph indicated by symbol GL5 shows insertion loss due to the high-speed transmission connector 5 of the present embodiment. The conventional high-speed connector does not have a cap at the contact tip end and the receiving tip end portions of the signal contact and the ground contact are long. The length of the receiving tip end portion must be a length to such an extent that the contact pin tip end does not buckle when the module substrate is inserted, and the receiving tip end portion is longer than the length of the curved portion.

As shown in FIG. 19, it can be seen that in the conventional example, insertion loss forming a V shape occurs in the vicinity of each of 32 Ghz, 46 Ghz and 56 Ghz, and further, significant insertion loss occurs from about 68 GHz.

On the other hand, according to the high-speed transmission connector 5 of the present embodiment, it can be seen that insertion loss occurs gently as the frequency increases, but it can be seen that no large increase in insertion loss occurs even in the frequency band of about 68 GHz or higher.

As described above, according to the present embodiment, a high-speed transmission connector that enables a smoother and more stable electrical connection with an external device in addition to having good transmission performance in the high frequency range is provided.

Although the embodiments of the present disclosure have been described with reference to the accompanying drawings, these are provided for easy understanding of the disclosure, and the claims of the present disclosure are not limited thereby.

A person skilled in the art can implement the present disclosure by various modifications without departing from the scope and spirit of the present disclosure, for example, by incorporating the features of one Example into another Example, yet another Example can be obtained. A person skilled in the art can make various modifications, equivalent substitutions, or improvements in accordance with the spirit of the present disclosure without departing from the scope of the claims.

In addition, the tip ends of the convex portions respectively provided on the lower surface of the conductive resin 510 and the upper surface of the conductive resin 610 described with reference to FIG. 16 may have slight gaps with respect to the ground contacts of the contacts 1a and 1b. More specifically, it is good if they are arranged at a distance where a high frequency of 1 GHz or higher can be electrically connected. The gap due to this distance is usually allowed up to a distance of about 0.05 mm to about 0.1 mm.

In addition, the material of the conductive resin may be an antistatic resin having a conductivity of about 10 S/m to 200 S/m. The dielectric constant described above is more suitable if it is 30 to 150 S/m.

Also in the present embodiment, similar to the first embodiment described above, various modification examples are possible for the installation of the conductive resin. As the first modification example shown in FIG. 9 to FIG. 11, the conductive resin may be provided between the lower surface of the first insert housing 520 and the upper surface of the second insert housing 620, and as the second modification example shown in FIG. 12 to FIG. 14, the conductive resin may be arranged between the third linear portions 17a-k (k=1-7) and the sixth linear portions 17b-k (k=1-7). Further, the conductive resin may be arranged at a plurality of locations by combining the modification examples described above. The same applies to the first embodiment.

Further, in the embodiment described above, the number of the contacts was set to 30 (k=30) or 7 (k=7), but it may be less than or equal to this number or may exceed this number.

What is claimed is:
1. A high-speed transmission connector, comprising:
a connector housing that comprises a slot into which a header of an external communication device is fitted, and an upper plate portion and a lower plate portion facing each other with the slot sandwiched therebetween, and is provided with holes opened on the slot side in the upper plate portion and the lower plate portion;
a first contact row arranged within the connector housing;
a second contact row arranged face to face with the first contact row within the connector housing;
a first cap supported in the hole of the upper plate portion by making a portion project to the slot side; and
a second cap supported in the hole of the lower plate portion by making a portion project to the slot side, wherein each contact of the first contact row and the second contact row comprises a receiving portion that receives the header, and the receiving portion comprises a receiving tip end portion facing an insertion side of the header and positioned at a certain angle with respect to a surface of the header, and a curved portion extending from a rear end of the receiving tip end portion and bent in an arch shape,
an accommodation space accommodating at least a portion of the receiving tip end portion is provided in a wall surface on a side where the contacts are located in the first cap and the second cap,
the receiving tip end portion of each contact in the first contact row is in contact with the wall surface within the accommodation space of the first cap or faces the wall surface through a gap,
the receiving tip end portion of each contact in the second contact row is in contact with the wall surface within the accommodation space of the second cap or faces the wall surface through a gap.

2. The high-speed transmission connector according to claim 1, wherein a length of the receiving tip end portion is 0.3 to 1 time as long as a length of the curved portion.

3. The high-speed transmission connector according to claim 1, wherein tapered surfaces inclined relative to a fitting direction are provided on surfaces of the first cap and the second cap on a side where the header is fitted.

4. The high-speed transmission connector according to claim 1, wherein wall surfaces of the accommodation spaces in the first cap and the second cap with which the receiving tip end portions of the first and second contact rows are in contact with or face are inclined with respect to the fitting direction.

5. The high-speed transmission connector according to claim 1, wherein an elastic member that urges the first cap is provided within the hole of the upper plate portion, an elastic member that urges the second cap is provided within the hole of the lower plate portion, a cap stopper that stops the first cap is provided in an inner peripheral wall of the hole of the upper plate portion on an opposite side to a side where the elastic member is located, a cap stopper that stops the second cap is provided in an inner peripheral wall of the hole of the lower plate portion on an opposite side to a side where the elastic member is located.

6. The high-speed transmission connector according to claim 1, wherein signal electrodes and ground electrodes are arranged on uppermost and lowermost surfaces of the header, a first concave portion is provided at a position corresponding to the signal electrode on a lower surface of the first cap,
a second concave portion is provided at a position corresponding to the signal electrode on an upper surface of the second cap.

7. The high-speed transmission connector according to claim 1, wherein each contact in the first contact row comprises:
a first linear portion extending from a rear end of the receiving portion, a second linear portion extending rearward from the first linear portion, and a third linear portion extending downward from the second linear portion,
each contact in the second contact row comprises:
a fourth linear portion extending from a rear end of the receiving portion, a fifth linear portion extending rearward from the fourth linear portion, and a sixth linear portion extending downward from the fifth linear portion, the high-speed transmission connector comprises:
a first insert housing supporting the second linear portion of the first contact row;
a second insert housing supporting the fifth linear portion of the second contact row;
a first conductive resin arranged on an upper surface of the first insert housing; and
a second conductive resin arranged on a lower surface of the second insert housing,
a plurality of first convex portions protruding upward are provided on an upper surface of the first conductive resin, and the first convex portion is electrically connected to the ground contact in the first insert housing through a slit provided in the upper surface of the first insert housing,
a plurality of second convex portions protruding downward are provided on a lower surface of the second conductive resin, and the second convex portion is electrically connected to the ground contact in the second insert housing through a slit provided in the lower surface of the second insert housing.

8. The high-speed transmission connector according to claim 1, wherein each contact in the first contact row comprises:
a first linear portion extending from a rear end of the receiving portion, a second linear portion extending rearward from the first linear portion, and a third linear portion extending downward from the second linear portion,
each contact in the second contact row comprises:
a fourth linear portion extending from a rear end of the receiving portion, a fifth linear portion extending rearward from the fourth linear portion, and a sixth linear portion extending downward from the fifth linear portion, the high-speed transmission connector further comprises:
a first insert housing supporting the second linear portion of the first contact row;
a second insert housing supporting the fifth linear portion of the second contact row; and
a conductive resin arranged between a lower surface of the first insert housing and an upper surface of the second insert housing,
a plurality of first convex portions protruding upward and a plurality of second convex portions protruding downward are provided on an upper surface and a lower surface of the conductive resin, respectively,
the first convex portion is electrically connected to the ground contact in the first insert housing through a slit provided in the lower surface of the first insert housing,
the second convex portion is electrically connected to the ground contact in the second insert housing through a slit provided in the upper surface of the second insert housing.

9. The high-speed transmission connector according to claim 1, wherein each contact in the first contact row comprises:
a first linear portion extending from a rear end of the receiving portion, a second linear portion extending rearward from the first linear portion, and a third linear portion extending downward from the second linear portion,
each contact in the second contact row comprises:
a fourth linear portion extending from a rear end of the receiving portion, a fifth linear portion extending rearward from the fourth linear portion, and a sixth linear portion extending downward from the fifth linear portion,
the high-speed transmission connector comprises a conductive resin arranged between the third linear portion and the sixth linear portion,
a plurality of first convex portions protruding rearward and a plurality of second convex portions protruding forward are provided on a rear surface and a front surface of the conductive resin, respectively,
the first convex portion is electrically connected to the third linear portion, and the second convex portion is electrically connected to the sixth linear portion.

10. A high-speed transmission connector comprising:
a connector housing that comprises a slot into which a header of an external communication device is fitted, and an upper plate portion and a lower plate portion facing each other with the slot sandwiched therebetween, and is provided with holes opened on the slot side in the upper plate portion and the lower plate portion;
a first contact row arranged within the connector housing, in which one or more signal contacts and ground contacts are lined up;
a second contact row arranged face to face with the first contact row within the connector housing, in which one or more signal contacts and ground contacts are lined up;
a first cap attached to a tip end of the first contact row on a side where the header is received; and a second cap attached to a tip end of the second contact row on a side where the header is received,
wherein each contact of the first contact row and the second contact row comprises a receiving portion that receives the header, and the receiving portion comprises a receiving tip end portion located on a first cap side and a second cap side, and a curved portion extending from a rear end of the receiving tip end portion to a side opposite to the first cap side and the second cap side and bent in an arch shape,
the first cap is provided with an accommodation space accommodating the receiving tip end portion of the signal contact of the first contact row, and is supported by the ground contact of the first contact row,
the second cap is provided with an accommodation space accommodating the receiving tip end portion of the signal contact of the second contact row, and is supported by the ground contact of the second contact row.

11. The high-speed transmission connector according to claim 7, wherein the receiving tip end portion of the signal contact is shorter than the receiving tip end portion of the ground contact.

12. The high-speed transmission connector according to claim 7, wherein tapered surfaces inclined with respect to a fitting direction are provided on surfaces of the first cap and the second cap on a side where the header is fitted.

13. The high-speed transmission connector according to claim 7, wherein each contact in the first contact row comprises:
a first linear portion extending from a rear end of the receiving portion, a second linear portion extending rearward from the first linear portion, and a third linear portion extending downward from the second linear portion,
each contact in the second contact row comprises:
a fourth linear portion extending from a rear end of the receiving portion, a fifth linear portion extending rearward from the fourth linear portion, and a sixth linear portion extending downward from the fifth linear portion, the high-speed transmission connector comprises:
a first insert housing supporting the second linear portion of the first contact row;
a second insert housing supporting the fifth linear portion of the second contact row;
a first conductive resin arranged on an upper surface of the first insert housing; and
a second conductive resin arranged on a lower surface of the second insert housing,
a plurality of first convex portions protruding upward are provided on an upper surface of the first conductive resin, and the first convex portion is electrically connected to the ground contact in the first insert housing through a slit provided in the upper surface of the first insert housing,
a plurality of second convex portions protruding downward are provided on a lower surface of the second conductive resin, and the second convex portion is electrically connected to the ground contact in the second insert housing through a slit provided in the lower surface of the second insert housing.

14. The high-speed transmission connector according to claim 7, wherein each contact in the first contact row comprises:
a first linear portion extending from a rear end of the receiving portion, a second linear portion extending rearward from the first linear portion, and a third linear portion extending downward from the second linear portion,
each contact in the second contact row comprises:
a fourth linear portion extending from a rear end of the receiving portion, a fifth linear portion extending rearward from the fourth linear portion, and a sixth linear portion extending downward from the fifth linear portion, the high-speed transmission connector further comprises:
a first insert housing supporting the second linear portion of the first contact row;
a second insert housing supporting the fifth linear portion of the second contact row; and
a conductive resin arranged between a lower surface of the first insert housing and an upper surface of the second insert housing,
a plurality of first convex portions protruding upward and a plurality of second convex portions protruding downward are provided on an upper surface and a lower surface of the conductive resin, respectively,
the first convex portion is electrically connected to the ground contact in the first insert housing through a slit provided in the lower surface of the first insert housing,
the second convex portion is electrically connected to the ground contact in the second insert housing through a slit provided in the upper surface of the second insert housing.

15. The high-speed transmission connector according to claim 7, wherein each contact in the first contact row comprises:
- a first linear portion extending from a rear end of the receiving portion, a second linear portion extending rearward from the first linear portion, and a third linear portion extending downward from the second linear portion, each contact in the second contact row comprises:
- a fourth linear portion extending from a rear end of the receiving portion, a fifth linear portion extending rearward from the fourth linear portion, and a sixth linear portion extending downward from the fifth linear portion,
- the high-speed transmission connector comprises a conductive resin arranged between the third linear portion and the sixth linear portion,
- a plurality of first convex portions protruding rearward and a plurality of second convex portions protruding forward are provided on a rear surface and a front surface of the conductive resin, respectively,
- the first convex portion is electrically connected to the third linear portion, and the second convex portion is electrically connected to the sixth linear portion.

* * * * *